INVENTOR
Quentin D. Corley, Jr.

BY Cecil L. Wood

ATTORNEY

Nov. 1, 1966    Q. D. CORLEY, JR    3,282,451
FOLDABLE LOAD LIFTING APPARATUS
Filed April 7, 1965                               5 Sheets-Sheet 4

INVENTOR
Quentin D. Corley, Jr.
BY  *Cecil L. Wood*
ATTORNEY

Nov. 1, 1966  Q. D. CORLEY, JR  3,282,451
FOLDABLE LOAD LIFTING APPARATUS

Filed April 7, 1965

INVENTOR
Quentin D. Corley, Jr.

BY  *Cecil L. Wood*

ATTORNEY

# United States Patent Office 3,282,451
Patented Nov. 1, 1966

3,282,451
FOLDABLE LOAD LIFTING APPARATUS
Quentin D. Corley, Jr., 326 S. Rock Island,
Dallas, Tex.
Filed Apr. 7, 1965, Ser. No. 446,365
7 Claims. (Cl. 214—77)

This invention relates to loading and handling apparatus for trucks, and it has particular reference to hydraulically operated devices by which relatively heavy objects can be readily hoisted from the ground surface to the level of a carrier vehicle.

In the trucking industry some of the primary problems in the loading and unloading of cargo has been concerned with the provision of facilities by which such operations can be performed with a minimum amount of labor required and time consumed, and especially in instances where dock facilities are not readily available.

In recent years there have been provided various devices for loading and unloading cargo which are designed to be carried by the vehicle, but these mechanisms are generally designed to be installed at the rear of the carrier vehicle and have the dual purpose of raising and lowering the materials transported thereby and providing a tail gate for the vehicle, or in the case of closed van-type bodies, the platform lift is retractible beneath the rear of the vehicle. Such devices are a great aid to the industry but no practical platform loader has been heretofore designed for side loading operations.

A primary object of the invention, therefore, resides in the provision of a cargo handling device designed for installation on the side of a truck or trailer, having an open or van-type body, and which is fully retractible beneath the frame of the vehicle while providing for legal road clearances alongside and without interfering with the normal operation of the vehicle.

An object of the invention is that of providing a platform lift and loader capable of hoisting and handling substantial weights to and from the ground surface, operating by hydraulic power, and fully extensible and retractible from the side of the vehicle, affording apparatus by which loading and unloading operations can be performed, if desirable, from a dock at the rear of the vehicle or from the ground surface at one side thereof.

Another object of the invention is that of providing a loading device of the type and character described in which is embodied a simple arrangement of levers and linkages by which the platform can be extended and retracted, and raised and lowered, with a minimum of effort, and by which transference and handling of various types and forms of materials can be accomplished by a single workman, and providing facilities by which a variety of forms of cargo can be loaded or unloaded under any and all circumstances and without the necessity for dock facilities.

Yet another object of the invention resides in the provision of a cargo loading device which, by reason of its simplicity of design, is capable of economical installation since a minimum of alterations of the truck frame need be resorted to in the application of the mechanism yet enabling the assembly to be completely withdrawn beneath the frame with a maximum amount of road clearance.

Broadly, the invention contemplates the provision of a power actuated load handling device for trucks and trailers which is capable of installation on either side or at the rear of a carrier vehicle, and having embodied therein a unique arrangement of linkages and arms by which the apparatus can be compactly stored in transit with adequate and safe road clearance.

While the foregoing objects are paramount, other and lesser objects will become apparent as the description proceeds when considered in connection with the appended drawings wherein:

FIGURE 4 is a plan view of the invention in retracted position showing the laterally hinged arms in folded positions, and illustrating the operating levers and linkages in inoperative positions.

The invention is designed to be installed on any type of truck or trailer and used as a side or rear end loader, and has embodied therein certain novel features enabling the device to be completely retracted beneath the carrier body, avoiding any projecting elements which would interfere with safe road clearances.

Figure 7:
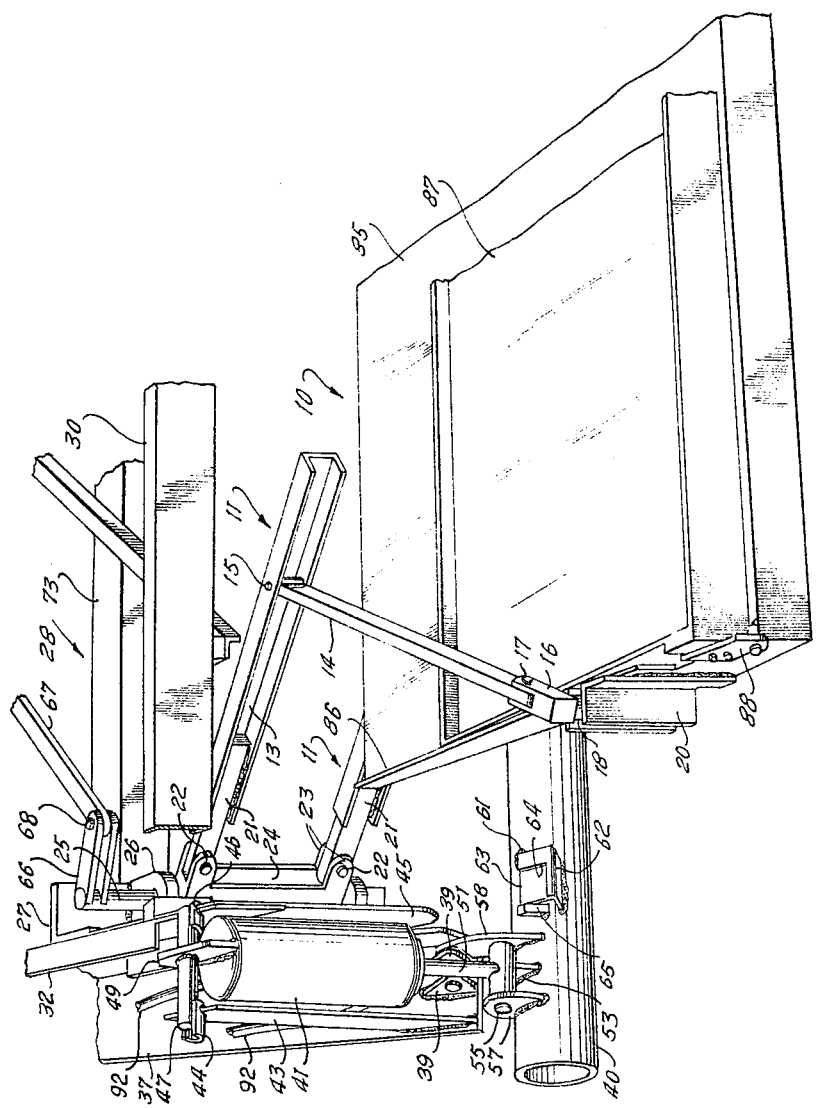
FIGURE 7 is a fragmentary perspective illustration of the platform in semi-retracted position, and showing one of the rams, a pair of the hinged arms, and a portion of the levers and linkage elements.

The lift platform 10 is adapted to be maintained in a horizontal plane at all times and is raised and lowered by two pairs of arms 11 and 12, each pair being spaced vertically and comprising inner and outer elements 13 and 14 which are hingedly connected by pins 15 whereby each arm 11 and 12 is caused to break laterally and fold inwardly when the lift platform 10 is retracted as illustrated in FIGURES 4 and 7. The outer ends of each of the outer elements 14 of the arms 11 and 12 are hingedly connected to clevis blocks 16 by pins 17, the blocks 16 being integral with the opposing ends of a shaft 18 vertically arranged on each end of the platform 10 and rotatable in a sleeve 19 which is welded to a channel bracket 20 secured, as by welding, to the ends of the platform 10, as shown in FIGURES 2, 3 and 7.

Figure 5:
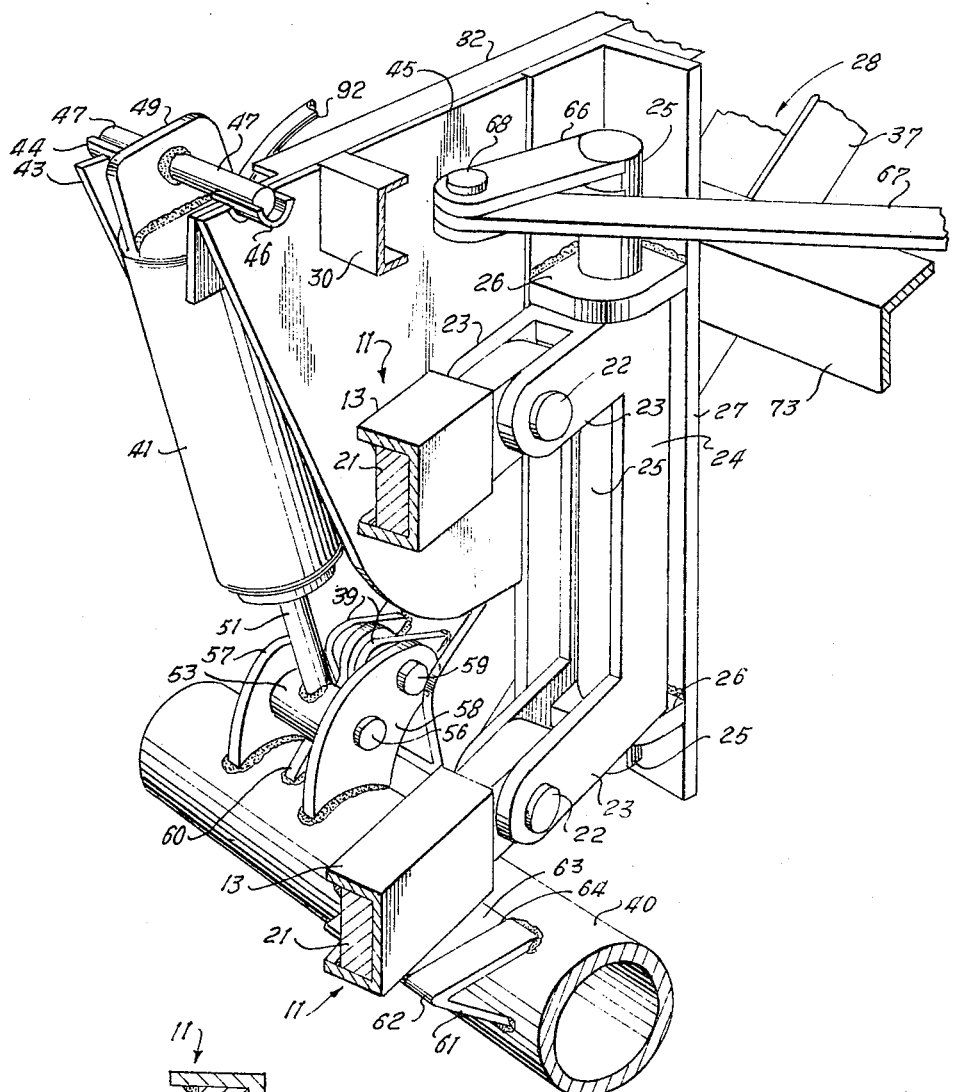
FIGURE 5 is a perspective illustration of one of the pivoting arm brackets and one of the hydraulic rams for rotating the lift shaft, the latter being fragmentarily shown.
Figure 6:
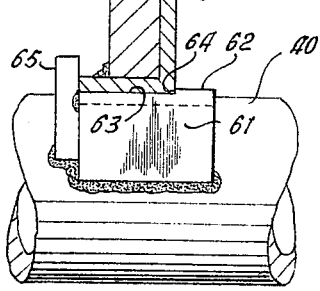
FIGURE 6 is a fragmentary illustration of the lift shaft and one of the cams, and showing one of the lower arms, in transverse section, supported on the cam.

The inner elements 13 of the arms 11 and 12 are channel-shaped in transverse section, as best shown in FIGURES 5, 6 and 7, while the outer elements 14 are solid bars, rectangular in transverse section, and capable of being received in the elements 13 when the elements are axially aligned, as shown in FIGURES 1, 2, 3 and 7. The inner ends of the elements 13 are pivotally connected through the pins 15 to the elements 13, the pivotal points being spaced from the outer ends of the latter so as to lend rigidity to the arms 11 and 12 when these are extended in the manner shown in FIGURES 1, 2 and 3.

The inner ends of the channel-shaped elements 13 are welded to bars 21 which lie conformably in the members 13 and having the greater portion of their length embraced thereby for suitable rigidity, as shown in FIGURES 5, 6 and 7. The inner ends of each pair of the bars 21 are pivoted on pins 22 between the spaced lugs 23 formed on the upper and lower ends of a channel-shaped bracket 24 which is welded to a short shaft 25 journalled at its upper and lower ends in plates 26 welded to an angle bracket 27 supported at each end of the main frame structure 28 which supports the assembly beneath the vehicle frame 29, as best shown in FIGURES 2, 3, 4, 5 and 6.

Figure 2:
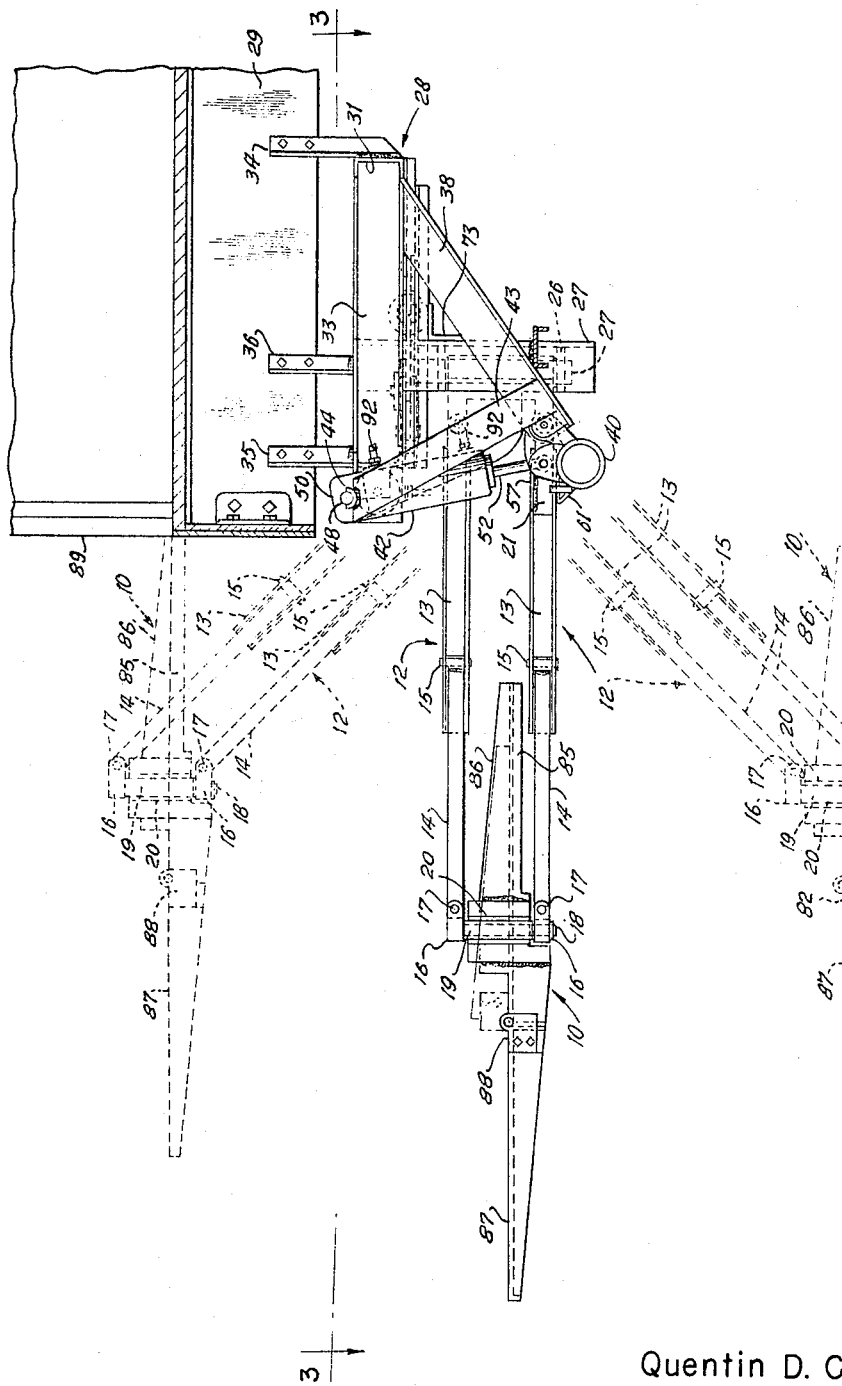
FIGURE 2 is a side elevational view, on line 2—2 of FIGURE 1, of the invention, shown in intermediate position in solid lines, and in elevated and lowered positions in broken lines, the truck frame to which it is attached being fragmentarily shown.
Figure 3:
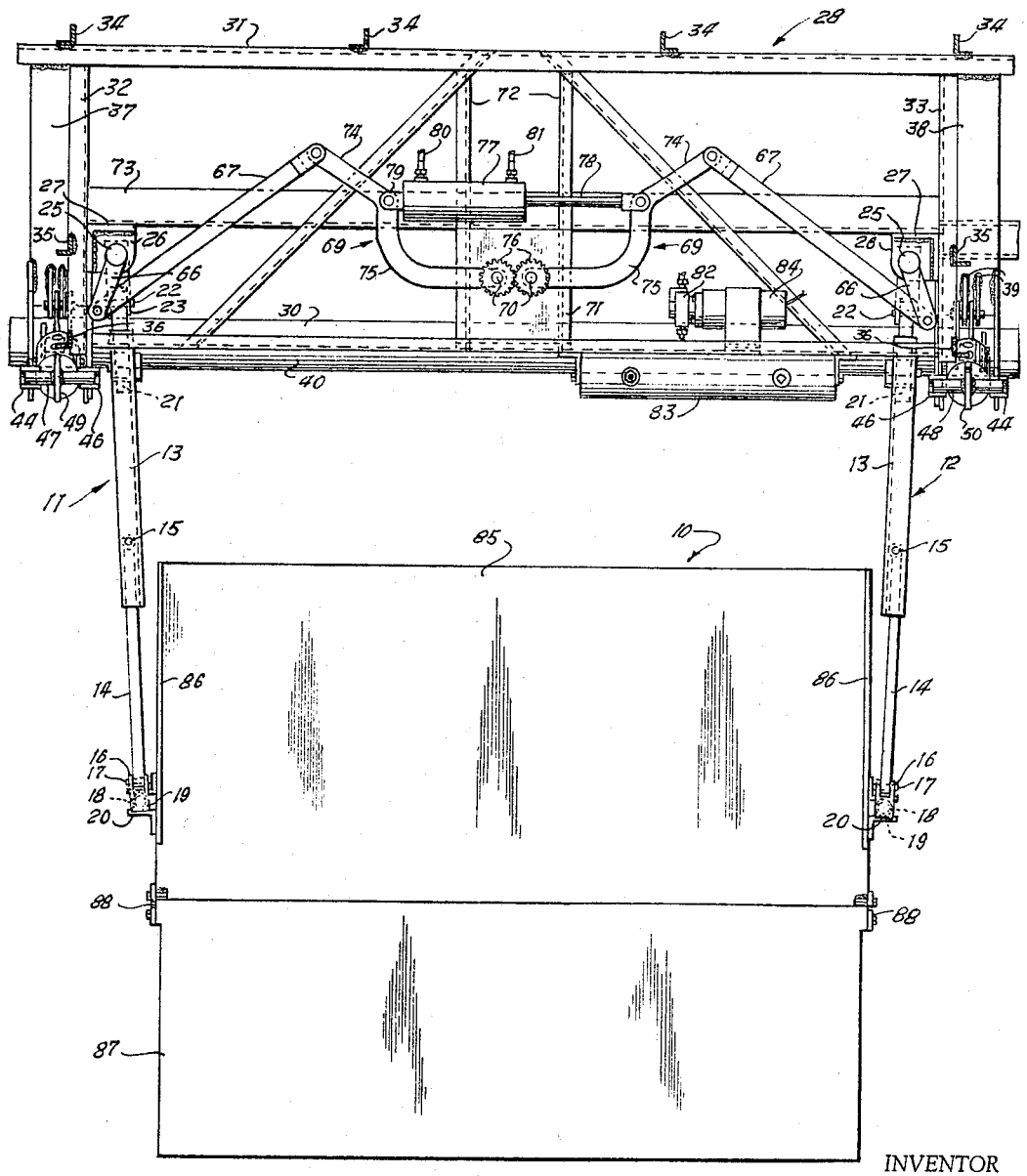
FIGURE 3 is a plan view of the platform, on line 3—3 of FIGURE 2, showing the latter in its lowermost position and showing the operating levers and linkages.

The main frame structure 28 comprises front and rear channel members 30 and 31 connected at their ends by transverse channel members 32 and 33 defining a rectangular structure which is suspended from the vehicle frame 29 by angular brackets 34 spaced along the rear member 31, and by similar brackets 35 and 36 secured to each front corner of the main frame structure 28 and at each end thereof, respectively, as shown in FIGURES 2, 3 and 4.

The upper ends of the angle brackets 27 are attached to the end frame members 32 and 33 and are suspended therefrom, the lower ends of the brackets 27 being secured to the adjacent flanges of angular brace members 37 and 38 which are attached to the undersides of the end members 32 and 33 near their rearmost ends and incline downwardly and outwardly, as shown in FIGURE 2. At the lower ends of the brace members 37 and 38 are spaced lugs 39 which are welded to the horizontal flanges thereof and which provide pivotal support for a tubular shaft 40 by which the platform 10 is raised and lowered through the medium of a pair of hydraulic cylinders 41 and 42 in a manner which will be presently described.

Secured at their lower ends to each of the brace members 37 and 38, and along the outer edges of the horizontal flanges thereof, are elongated plates 43 which extend upwardly and incline outwardly from the members 37 and 38, each having a cradle 44, which is arcuate in transverse section, welded across its upper end so that the axes of the cradles 44 are transverse to the longitudinal axes of the plates 43, as shown in FIGURES 1, 2, 4, 5 and 7.

Opposite the plates 43, and adjacent to the vertical flanges of the brace members 37 and 38, are plates 45 whose right-angular top and rear edges, respectively, are attached to the end members 32 and 33 of the frame 28, and the angular brackets 27, the outer edges of the plates 45 being inclined inwardly and downwardly and curved near their lower portions, as shown in FIGURES 2 and 5, the rear straight edges thereof abutting the perpendicular flanges of the brackets 27, as best illustrated in FIGURE 5. At the forward upper edges of the plates 45 are cradles 46 which are identical to and aligned with the cradles 44 attached to the upper ends of the plates 43.

The hydraulic cylinders 41 and 42 are supported between the plates 43 and 45 by pins 47 and 48 which are arranged through and welded to plates 49 and 50 attached to the tops of the cylinders 41 and 42, the pins 47 and 48 projecting laterally from each side of each plate 49 and 50 and adapted to repose in the cradles 44 and 46, respectively, so as to permit the cylinders 41 and 42 to oscillate while the platform 10 is raised and lowered. The outer ends of the plungers 51 and 52 of the cylinders 41 and 42, respectively, have bearing sleeves 53 and 54 integral therewith and having their axes transverse to the axes of the plungers 51 and 52 whereby the latter are pivotally connected by pins 55 and 56 between pairs of lugs 57 and 58 welded to the shaft 40, as shown in FIGURES 5 and 7.

The lugs 58 are longer than the lugs 57, and are curved rearwardly and pivotally connected by pins 59 to the lugs 39 on the member 37, as shown more in detail in FIGURES 5 and 7. Attached to the shaft 40, between the lugs 57 and 58 thereon, are lugs 60 which are shaped to avoid contact with the bearing sleeves 53 of the plungers 51 and 52 and extend rearwardly and upwardly so that their outer ends are aligned with those of the lugs 58 and are pivoted on the pins 59 which extend through the paired lugs 39, as best seen in FIGURE 5. The purpose of this arrangement will become apparent as the description proceeds.

Near each end of the shaft 40, and spaced inwardly from the lugs 57, 58 and 60, is a cam element 61 which, as shown in FIGURES 5 and 7, comprises a plate bent to a V-shape and having both angular portions welded to the tubular shaft 40, the planar surface of the uppermost portion being tangential to the cylindrical surface of the shaft 40, the crown or bight 62 being relatively sharp but slightly rounded to insure smooth operation.

Each of the lower elements 13 of the arms 11 and 12, when extended as shown in FIGURES 1, 2, 3 and 6, are supported on the cams 61 and are manipulated thereby to their respective upper, lower and intermediate positions. The upper faces 63 of the cam elements 61 are recessed to define shoulders 64 on one side which are opposed by guide blocks 65 thus providing means for maintaining the foldable arms 11 and 12 in rigid alignment when the platform 10 is raised and lowered.

Attached to the upper ends of the shafts 25 are paired vertically spaced arms 66 which extend horizontally therefrom, each having a link 67 pivotally connected to their outer ends by pins 68. The opposite ends of the links 67, which extend inwardly from each end of the frame 28, are pivoted to the outer ends of levers 69 whose inner ends are pivotally attached by stub shafts 70 to a horizontal plate 71 supported on a pair of angle frame members 72 connecting the side elements 30 and 31 of the frame 28, as shown in FIGURES 3 and 4. An angle bar 73 is arranged longituidnally of the frame 28, intermediate the side elements 30 and 31, and rearwardly of the brackets 27.

The levers 69 have straight portions 74, whose outer ends are pivotally attached to the links 67, and curved portions 75 whose ends are pivoted on the stub shafts 70. The levers 69 are opposingly arranged and are connected by a pair of gears 76 fixed to the pivoted ends to rotate about the shafts 70. At the juncture between the straight portions 74 and the curved portions 75 of the levers 67 the latter are pivotally connected by a hydraulic cylinder 77 and its plunger 78, as shown in FIGURES 3 and 4.

The cylinder 77 and its plunger 78 are not fixed and move rearwardly according to the positions of the levers 69. The cylinder 77 has a clevis 79 on its outer end pivotally attached to one of the levers 69 while the outer end of the plunger 78 is pivoted to the opposite lever 69. The plunger 78, which is adapted to be operated in either direction, will actuate the levers 69 in unison to their respective operative and inoperative positions, as illustrated in FIGURES 3 and 4. Flexible fluid conduits 80 and 81 are provided at each end of the cylinder 77 which are connected through a pump 82 to the fluid reservoir 83 attached to the frame 28. The pump 82 is operated by a motor 84.

The platform 10 is preferably comprised of foldable elements whereby it may be more compactly stored while in its retracted position, as shown in FIGURE 4. The primary element 85, to which the elevating arms 11 and 12 are attached, is planar and a suitable non-slip tread surface may be provided if desired. Flanges 86 are arranged along each end and the upper edges of these elements incline rearwardly, as indicated in both solid and broken lines in FIGURE 2.

Along the outer edge of the element 85 is attached an extension 87 through hinges 88 at each end whereby this element can be folded over upon the element 85. In this manner a maximum loading surface can be provided without materially increasing the storage space beneath the carrier vehicle 89. The longitudinal dimension of the extension element 87 is such that it can repose between

OPERATION

The loading platform 10 is manipulated to extended and retracted positions by the hydraulic plunger 78 of the cylinder 77, which is operative in both directions, to push and pull the levers 69 to the respective positions shown in FIGURES 3 and 4. To extend the platform 10, as shown in FIGURE 3, a lever 90 on the operating panel 91, which is mounted in a suitable location on the vehicle 89, is operated to actuate the valve (not shown) to cause the hydraulic fluid to enter the cylinder 77 through the conduit 80 from the reservoir 83. The cylinder 77 and its plunger 78 will be extended to move the levers 69 apart, and being geared together by the gears 76, these elements are always synchronized in their movement.

The levers 69, through the links 67 pivoted to the outer ends of the portions 74 of the levers 69, will rotate the shafts 25, through the levers 66 thereon, to turn the members 24 outwardly whereby to cause the inner elements 13 of the arms 11 and 12 to move from their folded or retracted positions, shown in FIGURE 4, to the extended positions, shown in FIGURES 2 and 3. The intermediate positions of the elements 13 and 14 of the arms 11 and 12 is shown in perspective in FIGURE 7.

As the arms 11 and 12 are brought into their extended positions it is apparent that the outer elements 14 will be received in the outer portions of the inner channel members 13 to provide a rigid association. By reference to FIGURE 2 it will be noted that the platform 10 is first extended directly outwardly from the vehicle carrier in a horizontal plane. In this position the platform 10 can be raised and lowered to the positions shown in broken lines in FIGURE 2.

The raising and lowering operations of the platform 10 are performed through the medium of the hydraulic cylinders 41 and their plungers 51, which latter operate in either direction, to partially rotate the shaft 40 on which the cam element 61 is arranged whereby the arms 11 and 12, which extend across the cam 61 when extended, as shown in FIGURES 1, 2, 5 and 6, are raised or lowered to the positions shown in broken lines in FIGURE 2. The arms 11 and 12 are so arranged as to maintain a parallel relationship at all times.

Figure 1:
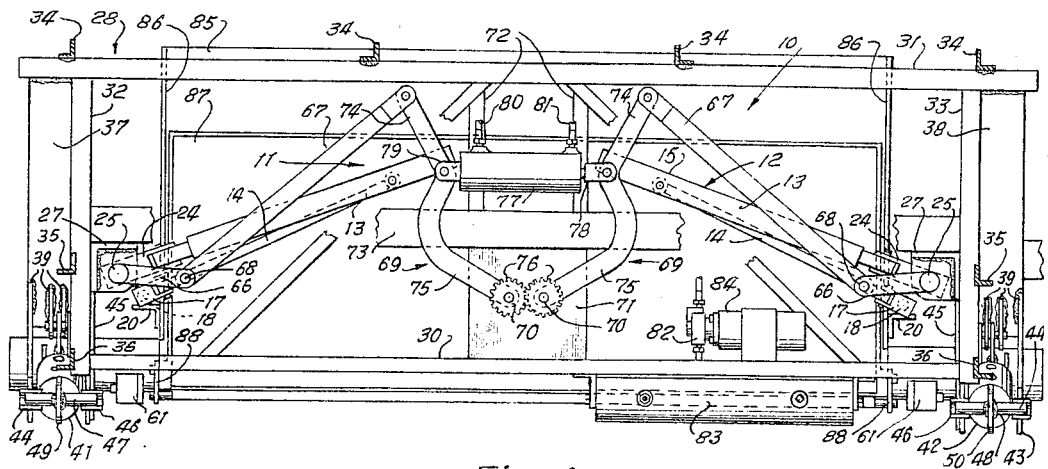
FIGURE 1 is a front elevational view of the invention, in extended and lowermost position, mounted on the side of a truck body, the latter being shown fragmentarily.

The plungers 51 of the cylinders 41 are actuated by hydraulic fluid passing through conduits 92 from the reservoir 83 under the influence of the pump 82 and controlled by valves (not shown) which are actuated by a lever 93 on the panel 91 shown in FIGURE 1.

To retract the assembly to its porting position beneath the carrier vehicle 89, as shown in FIGURE 4, the lever 90 on the panel 91 is operated to an opposite position to actuate a valve (not shown) which will cause the fluid to enter the cylinder 77 through the conduit 81 to retract the plunger 78 bringing the levers 69 toward each other to the position shown in FIGURE 4. The platform 10, however, must be first raised to its intermediate position, shown in solid lines in FIGURE 2, before it can be retracted.

When the cylinder 77 and its plunger 78 are operated to operate the levers 69 to their inoperative positions, shown in FIGURE 4, the arms 11 and 12 will break inwardly at the hinged point 15 between the elements 13 and 14, in the manner shown in FIGURE 7, and assume the positions illustrated in FIGURE 4.

While the invention is shown and described as applied to the side of a carrier vehicle, such as a truck or trailer, it may readily be installed at the rear of such vehicle with the same effect and function in the same manner, and although the various parts of the invention, and their association, have been described with particularity it is obvious that certain changes and modifications in the structure and design may be resorted to without departing from the spirit and intent of the invention.

What is claimed is:
1. In a cargo loading mechanism for trucks and trailers, a platform lift having a main frame attachable to a vehicle frame, and hydraulic means in said main frame for raising and lowering said platform, a linkage comprising a pair of parallel arms connecting each end of said platform to said main frame to raise and lower the same, each pair of said arms having inner and outer sections hingedly connected intermediate their ends whereby to fold inwardly to retract said platform horizontally into said main frame, when said platform is in its intermediate plane of operation, a lever assembly in said main frame for operating said arms to folded and extended positions, hydraulic means in said main frame for actuating said lever assembly, and hydraulic means in said main frame acting on said arms to raise and lower said platform in loading and unloading operations.

2. In a hydraulic lift for loading trucks having a main frame attachable to a vehicle frame and suspended therefrom, in combination, a loading platform operatively connected to said main frame and capable of being retracted thereinto while in inoperative position, a linkage at each end of said platform connecting the same to said main frame, each linkage having a pair of vertically spaced parallel arms capable of raising and lowering said platform to loading and unloading positions and maintaining said platform in horizontal planes, each pair of said arms comprising inner and outer sections hinged intermediate said main frame and said platform and foldable inwardly to retract said platform horizontally into said main frame to its inoperative position, a leverage mechanism in said main frame for folding and extending said arms, hydraulic means in said main frame for actuating said leverage mechanism, and hydraulic means acting on said arms, when extended, to raise and lower said platform.

3. In a hydraulic lift loader for trucks, a platform having a main frame capable of attachment to a truck frame beneath the body thereof, in combination with the main frame, a parallel linkage connecting each end of said platform to said main frame, each linkage comprising upper and lower members, each having inner and outer sections hingedly joined intermediate said main frame and said platform whereby to fold inwardly when said linkages are extended horizontally from said main frame to retract said platform thereinto while said platform is in a horizontal plane, a leverage assembly in said frame for folding and extending said linkages, hydraulic means for actuating said leverage assembly, and hydraulic means acting on said linkages, when extended, to raise and lower said platform.

4. In a hydraulic loading mechanism, as described in claim 1, wherein the inner and outer ends of each section of said parallel arms have both vertical and horizontal pivotal connections with said main frame and said platform, respectively.

5. In a hydraulic loading apparatus for trucks and trailers, having a main frame attachable to a vehicle frame, and a loading platform retractable into said main frame, a pair of parallel arms at each end of said platform for raising and lowering the same, each pair having both vertical and horizontal pivotal connection with said platform and said main frame, respectively, and comprising inner and outer sections hingedly connected intermediate said pivotal connections and capable of folding inwardly to retract said platform into said main frame when said platform is horizontally aligned therewith, a leverage mechanism in said main frame for extending and folding said arms, hydraulic means for actuating said leverage mechanism, and separate hydraulic means for acting on said arms to raise and lower said platform when extended from said main frame.

6. In a hydraulic loader for carrier vehicles, as described in claim 5, wherein the hinged connection between the inner and outer sections of said arms is offset from the outer ends of said inner sections and whereby said inner sections partially overlap the said outer sections when said arms are extended.

7. A hydraulic loader for trucks and trailers as described in claim 1, wherein one section of each pair of said arms is hinged to the opposite section so as to overlap a portion of said one section when said arms are extended and said sections are axially aligned.

References Cited by the Examiner
UNITED STATES PATENTS

| | | | |
|---|---|---|---|
| 758,493 | 4/1904 | Abbey | 214—75 |
| 3,138,270 | 6/1964 | McCarty | 214—77 |

GERALD M. FORLENZA, *Primary Examiner.*

R. G. SHERIDAN, *Assistant Examiner.*